(12) United States Patent
Okuno

(10) Patent No.: US 6,170,999 B1
(45) Date of Patent: *Jan. 9, 2001

(54) POWER TRANSMISSION DEVICE WHEREIN A FILM TAKE-UP SPOOL GEAR ALSO PARTAKES IN FILM REWINDING

(75) Inventor: Ryoji Okuno, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/994,425

(22) Filed: Dec. 19, 1997

(30) Foreign Application Priority Data

Dec. 27, 1996 (JP) .................................................... 8-351529

(51) Int. Cl.$^7$ ...................................................... G03B 1/00
(52) U.S. Cl. ............................................. 396/413; 396/418
(58) Field of Search ................................... 396/387, 395, 396/396, 411, 413, 418

(56) References Cited

U.S. PATENT DOCUMENTS

| | | |
|---|---|---|
| 4,479,705 | * 10/1984 | Tamamura et al. ................... 396/418 |
| 4,688,763 | 8/1987 | Wakabayashi et al. ......... 354/173.11 |
| 4,832,275 | 5/1989 | Robertson ............................ 242/71.1 |
| 4,959,672 | 9/1990 | Yoshino et al. ....................... 354/173 |
| 5,262,810 | * 11/1993 | Yoshino et al. . |
| 5,456,419 | 10/1995 | Ezawa . |
| 5,555,048 | * 9/1996 | Oldfield . |
| 5,576,784 | * 11/1996 | Tsunefuji et al. ..................... 396/418 |
| 5,594,516 | * 1/1997 | Noguchi ............................... 396/418 |
| 5,596,384 | * 1/1997 | Tanaka et al. ....................... 396/413 |
| 5,628,041 | * 5/1997 | Ezawa ................................. 396/418 |
| 5,697,263 | * 12/1997 | Funahashi et al. ............. 396/387 X |

FOREIGN PATENT DOCUMENTS 0 424 938 A2   5/1991   (EP) .

* cited by examiner

Primary Examiner—David M. Gray
(74) Attorney, Agent, or Firm—Robin, Blecker & Daley

(57) ABSTRACT

A power transmission device comprises a spool gear disposed at a film take-up spool and an output gear that outputs a driving force that has been transmitted to the spool gear. The spool gear acts both to drive a take-up spool in the course of film winding and to furnish power applied thereto in the course of film rewinding to a fork gear associated with a film cartridge.

13 Claims, 11 Drawing Sheets

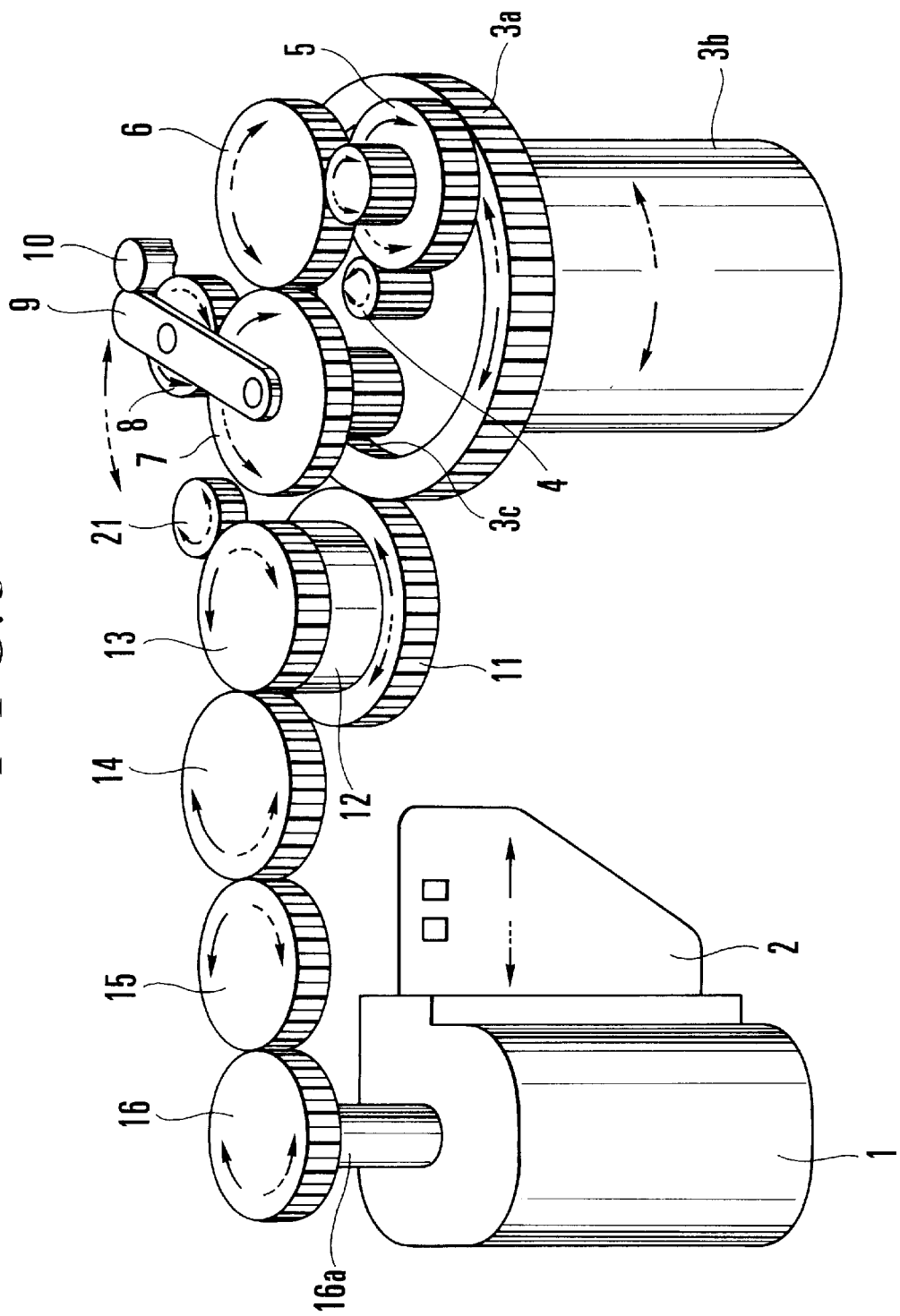
F I G. 3

F I G. 7
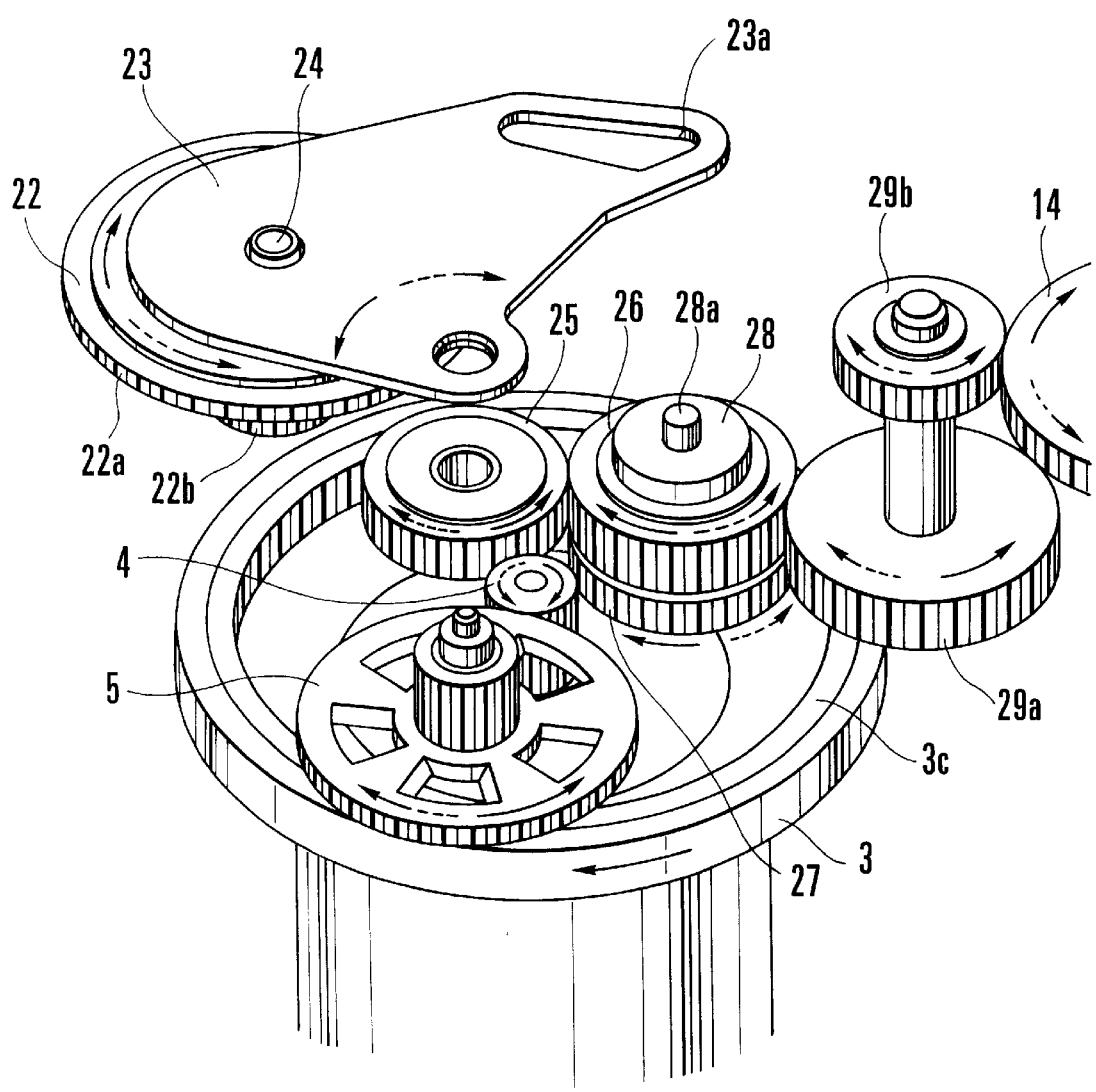

POWER TRANSMISSION DEVICE WHEREIN A FILM TAKE-UP SPOOL GEAR ALSO PARTAKES IN FILM REWINDING

BACKGROUND OF THE INVENTION

1. Field of the Invention

The present invention relates to a power transmission device for winding and rewinding a film in a camera or the like, and to an apparatus using the same.

2. Description of Related Art

Among various types of photographic films, there is a type of film in which a film leader part is stowed in a cartridge until use thereof and, after the cartridge is loaded in the camera or the like, a film is thrust out from the cartridge with a spool disposed within the cartridge (hereinafter referred to as the cartridge spool) driven by a film transport mechanism disposed inside the camera or the like, as disclosed in U.S. Pat. Nos. 4,832,275 and No. 4,834,306. Such a type of film is hereinafter referred to as the thrust type.

Further, there have been proposed various kinds of technique for winding a film thrust out from the thrust-type cartridge onto a take-up spool disposed in the camera or the like by driving the take-up spool and for rewinding the film into the cartridge by driving the cartridge spool, as disclosed in (i) Japanese Laid-Open Patent Application No. HEI 3-206435, (ii) Japanese Laid-Open Patent Application No. HEI 3-287150, (iii) Japanese Laid-Open Patent Application No. HEI 6-265989, etc.

For example, in the technique disclosed in (i) Japanese Laid-Open Patent Application No. HEI 3-206435, the change-over from a film thrusting-out operation by the driving of the cartridge spool to a film winding operation by the driving of the take-up spool is smoothly performed by utilizing a one-way clutch.

Also, in the technique disclosed in (ii) Japanese Laid-Open Patent Application No. HEI 3-287150, two transmission route channels are arranged to be selectively used to make smooth the change-over from a film thrusting-out operation by the driving of the cartridge spool to a film winding operation by the driving of the take-up spool, without using any one-way clutch.

Further, in the technique disclosed in (iii) Japanese Laid-Open Patent Application No. HEI 6-265989, a sun gear is disposed at the last stage of a reduction gear train, and is provided with two planet gears. One of the two planet gears is arranged to be used for performing a film winding operation by the driving of the take-up spool, and the other is arranged to be used for performing a film thrusting-out operation by the driving of the cartridge spool, so that the change-over from the film thrusting-out operation to the film winding operation can be smoothly performed with a compact gear train arrangement.

However, each of the above-mentioned kinds of technique has presented a problem in that there are required at least two channels of driving power transmission for driving the cartridge spool and for driving the take-up spool, thereby disadvantageously increasing the size of the device.

BRIEF SUMMARY OF THE INVENTION

In accordance with one aspect of the invention, there are provided a power transmission device for a camera or the like and an apparatus using the power transmission device, comprising a spool gear disposed at a film take-up spool and an output gear that outputs a driving force transmitted to the spool gear, so that the spool gear is used as an intermediate gear in transmitting the driving force, thereby enabling reduction in size and cost of the device.

The above and other aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 3 is a perspective view showing a film transport device according to a third embodiment of the invention.

FIG. 7 is an exploded perspective view showing a gear head part as viewed from the direction of an arrow A in FIG. 6.

DETAILED DESCRIPTION OF THE INVENTION

Hereinafter, preferred embodiments of the invention will be described in detail with reference to the drawings.

Figure 1:
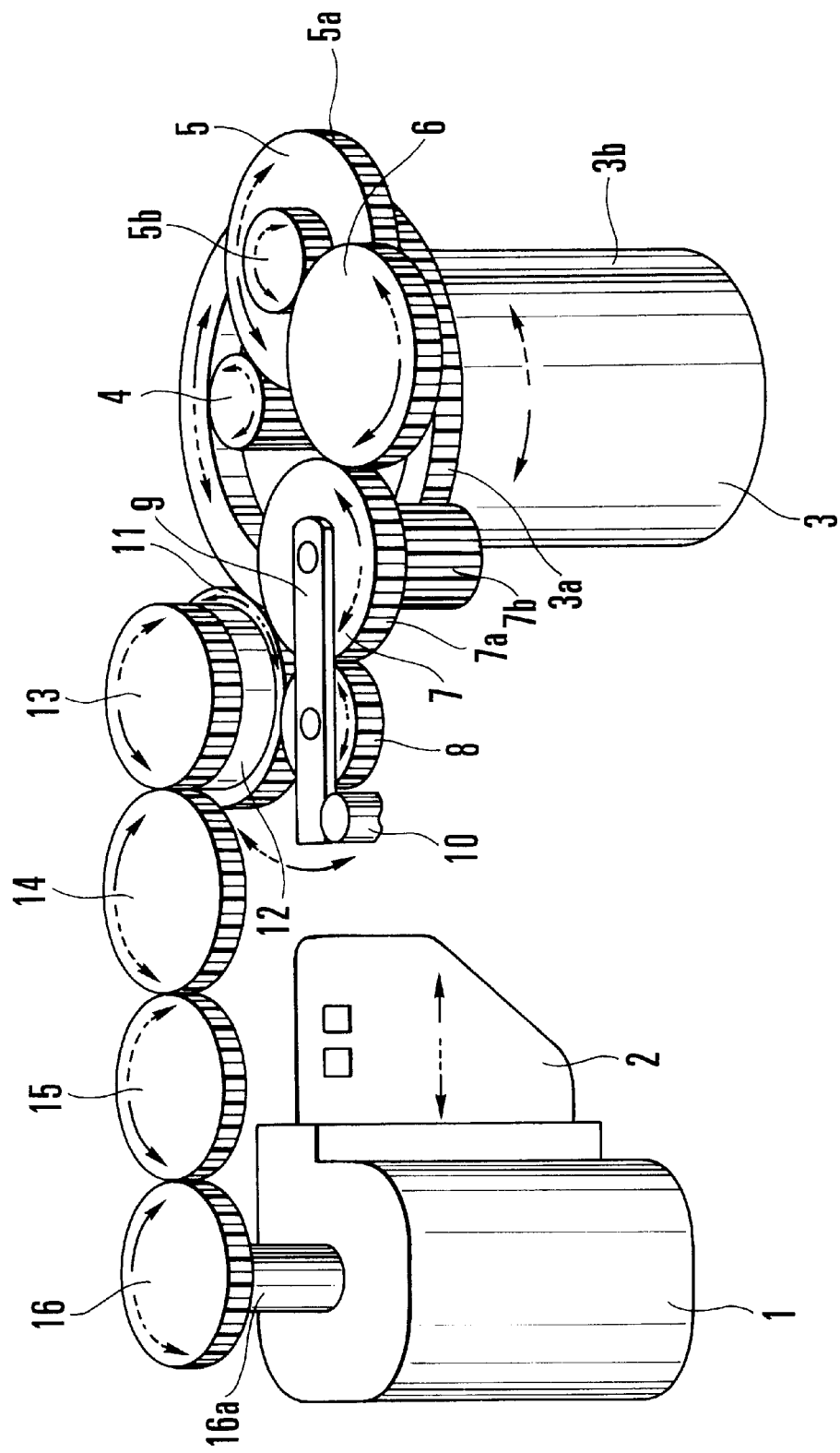
FIG. 1 is a perspective view showing a film transport device according to a first embodiment of the invention.

FIG. 1 shows in a perspective view a film transport device according to a first embodiment of the invention. The film transport device according to the first embodiment (also, according to other embodiments of the invention which will be described later) is used for various kinds of film using apparatuses, such as cameras, film viewers, etc.

Referring to FIG. 1, a film cartridge 1 is of a thrust type similar to that disclosed in U.S. Pat. No. 4,832,275, U.S. Pat. No. 4,834,306, etc. Specifically, as mentioned in the foregoing, the leader part of a film 2 is stowed in the cartridge 1 until use thereof, and, after the cartridge 1 is loaded into the film transport device, the film 2 is thrust out from the cartridge 1 with the cartridge spool driven to rotate.

A take-up spool 3 is arranged to wind up thereon the film 2 thrust out from the cartridge 1. The take-up spool 3 is provided with a film winding part 3b the surface of which is covered with an elastic rubber material for facilitating generation of a frictional force on the film 2, and a spool gear 3a provided for obtaining a rotating force. A pinion gear 4 is disposed inside the take-up spool 3 and is connected directly to a motor (not shown). A first reduction gear 5 has a large gear part 5a which is in mesh with the pinion gear 4. An idler gear 6 is in mesh with a small gear part 5b of the first reduction gear 5. A second reduction gear 7 has a large gear part 7a which is in mesh with the idler gear 6 and a small gear part 7b which is in mesh with the spool gear 3a. In a power transmission system composed of gears from the pinion gear 4 connected directly to the motor to the spool gear 3a, the gears are always in mesh with one after the other, as shown in FIG. 1, and no driving change-over member such as a planet gear or the like is included. Therefore, for example, in a case where the motor is disposed inside the take-up spool 3 as shown in FIG. 1, a reduction gear train can be closely arranged only at an upper part of a spool chamber which houses the take-up spool 3 therein.

A planetary arm 9 is mounted on the rotating shaft of the second reduction gear 7. A planet gear 8 which is rotatably mounted on the planetary arm 9 is in mesh with the large gear part 7a of the second reduction gear 7. Incidentally, a predetermined force of turning friction is imparted between the second reduction gear 7 and the planetary arm 9 by a spring (not shown).

A thrust (output) gear 11 is arranged to be always in mesh with the spool gear 3a. The thrust gear 11 is used as a member on the input side of a clutch part 12. A rewinding gear 13 is used as a member on the output side of the clutch part 12.

Figure 4:
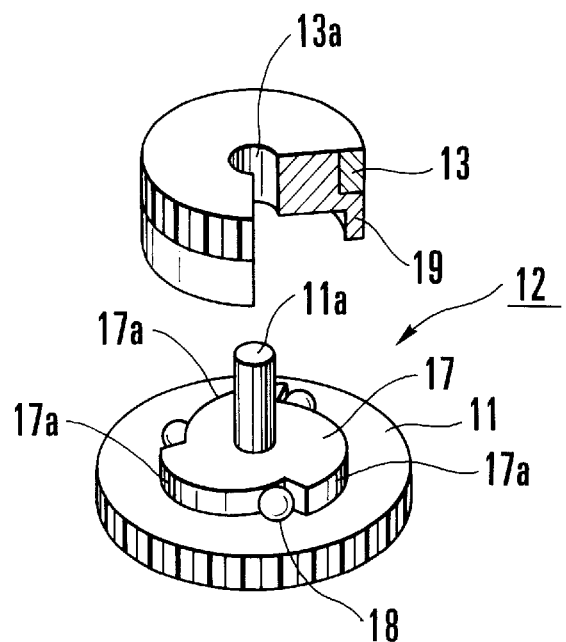
FIG. 4 is an exploded perspective view showing a clutch part used in each of the film transport devices in the first and third embodiments.

Here, an exploded perspective view of the clutch part 12 is shown in FIG. 4. Referring to FIG. 4, a cam plate 17, which is formed integrally with the thrust gear 11, is provided with projection parts 17a formed at three positions in the peripheral part thereof. The rewinding gear 13, which is shown in a sectional view in FIG. 4, is integrally provided with a bowl-shaped clutch tube 19 which is arranged to rotatably house the cam plate 17 therein. A shaft hole part 13a of the rewinding gear 13 and the clutch tube 19 are fitted on a rotating shaft 11a which is formed integrally with the thrust gear 11 and the cam plate 17. Steel balls 18 are arranged between the inner wall of the clutch tube 19 and the cam plate 17.

With the clutch part 12 configured in the above-described manner, the thrust gear 11 and the rewinding gear 13 are connected to each other when the steel balls 18 are sandwiched in between the inner wall of the clutch tube 19 and the projection parts 17a of the cam plate 17, and are disconnected from each other when the steel balls 18 fall into recessed parts formed between the projection parts 17a, depending on a relation of rotation speed between the thrust gear 11 and the rewinding gear 13.

Referring back to FIG. 1, an idler gear 14 is in mesh with the rewinding gear 13. An idler gear 15 is in mesh with the idler gear 14. A fork gear 16 is in mesh with the idler gear 15 and is integrally attached to a fork 16a, which engages the cartridge spool to drive the cartridge spool.

Next, operation of the film transport device arranged as described above will be described. In FIG. 1, arrows shown with full lines indicate driving directions in which the members mentioned above rotate for winding (thrusting out and taking up) the film 2. Arrows shown with broken lines indicate driving directions in which the members mentioned above rotate for rewinding the film 2.

First, when the pinion gear 4 is rotated by the motor in the film winding driving direction (indicated by a full-line arrow), the gear 5 which is in mesh with the pinion gear 4, the gears 6 and 7 and the spool gear 3a respectively rotate in the directions indicated by full-line arrows. The take-up spool 3 is thus caused to rotate also in the direction of a full-line arrow. In this instance, the rotation of the second reduction gear 7 causes the planetary arm 9 to turn in such a direction as to abut on a stopper 10. As a result, the planet gear 8 is retracted to a position where the planet gear 8 transmits no power to any of other gears.

The thrust gear 11, which is in mesh with the spool gear 3a, is caused to rotate in the direction of a full-line arrow by the motor driving force received through the spool gear 3. The rotation of the thrust gear 11 in the full-line arrow direction causes the steel balls 18 to be pushed against the inner wall of the clutch tube 19 by the projection parts 17a of the cam plate 17, so that the clutch part 12 is brought into a connecting state to cause the thrust gear 11 and the rewinding gear 13 to rotate integrally. The rotation of the rewinding gear 13 is transmitted to the fork gear 16 through the idler gears 14 and 15. The cartridge spool which engages the fork 16a is thus driven to rotate. As a result, the film 2 is thrust out from the cartridge 1.

When the film 2 which is thrust out from the cartridge 1 reaches the film winding part 3b of the take-up spool 3, the film 2 is wound on the film winding part 3b without slackening under a pushing action of a pushing means (not shown). The reduction ratios of the gear trains of the film transport device are set such that a peripheral velocity of the film 2 on the surface of the take-up spool 3 is always faster than the speed at which the film 2 is being thrust out from the cartridge 1. Therefore, a portion of the film 2 wound on the take-up spool 3 causes the fork gear 16 to rotate at the faster speed in the direction of a full-line arrow. As a result, the fork gear 16, the idler gears 14 and 15 and the rewinding gear 13 are rotated at the faster speeds in the direction of full-line arrows. When the rewinding gear 13 comes to rotate at a faster speed than the thrust gear 11 in the direction of a full-line arrow, the friction between the inner wall of the clutch tube 19 and the steel balls 18 causes the steel balls 18 to be moved into the recessed parts formed between the projection parts 17a of the cam plate 17. with the steel balls 18 thus brought into the recessed part, the clutch part 12 is released from the connecting state, so that power is stopped from being transmitted from the thrust gear 11 to the rewinding gear 13. Accordingly, after that, the film 2 comes to be wound up solely by means of the tape-up spool 3.

In addition, the thrust gear 11 and the spool gear 3a are arranged to form a last reduction stage, excluding the reduction stage of the idler gear 15 and the fork gear 16, for the film winding driving (the gears 13, 14 and 15 being arranged to make no reduction). By virtue of this gear arrangement, the gears 13, 14 and 15 do not generate any large load when the fork gear 16 is driven by the film 2. Therefore, a load on the motor in canceling the connecting state of the clutch part 12 can be lessened. Besides, the change-over from the film thrusting-out driving to the film winding driving can be speedily and smoothly performed.

On the other hand, when the pinion gear 4 is rotated by the motor in the direction of film rewinding (in the direction of a broken-line arrow), the reduction gears 5, 6 and 7 and the spool gear 3a respectively rotate in the directions of broken-line arrows to cause the take-up spool 3 to rotate in the direction of a broken-line arrow. Then, the rotation of the second reduction gear 7 causes the planetary arm 9 to turn away from the stopper 10, so that the planet gear 8 is brought to a position where the planet gear 8 meshes with the rewinding gear 13. Accordingly, the rotation of the second reduction gear 7 is transmitted to the rewinding gear 13 to cause the rewinding gear 13 to rotate in the direction of a broken-line arrow.

Also, the thrust gear 11, which is in mesh with the spool gear 3a, is caused by the driving force of the motor to rotate in the direction of a broken-line arrow. Thus, the rewinding gear 13 and the thrust gear 11 both receive the driving forces to be caused to rotate in the same direction across the clutch part 12. However, since the reduction ratio of a part from the motor to the rewinding gear 13 (the reduction ratio of the gears 4, 5, 6, 7a, 8 and 13) is set larger than the reduction ratio of a part from the motor to the thrust gear 11 (the reduction ratio of the gears 4, 5, 6, 7, 3a and 11), at the time of film rewinding driving, the rewinding gear 13 always rotates slower than the thrust gear 11. Therefore, the cam plate 17 is caused to rotate in such a direction as to bring the steel balls 18 into the recessed parts formed between the projection parts 17a of the cam plate 17. Accordingly, at the time of film rewinding driving, the clutch part 12 is always released from the connecting state. The driving force of the motor is thus transmitted to the fork gear 16 through the second reduction gear 7, the planet gear 8, the rewinding gear 13 and the idler gears 14 and 15.

Further, in rewinding the film 2, both the fork gear 16 and the take-up spool 3 are driven in the film rewinding direction. However, since the rewinding speed of the film 2 on the surface of the take-up spool 3 is set always faster than the rewinding speed of the film 2 on the surface of the cartridge spool which is rotated by the fork gear 16, the film 2 is brought into a loosely coiled state within the spool chamber, so that the film 2 can be prevented from being stretched.

As described above, in the film transport device according to the first embodiment, the spool gear 3a is used not only as a gear to which the driving force of the motor for driving the take-up spool 3 is inputted, but also as an idle gear for transmitting the driving force of the motor to the thrust gear 11 which is arranged to input the driving force of the motor to a cartridge-spool driving system composed of gears from the rewinding gear 13 to the fork gear 16. This arrangement permits reduction in number of gears required in the film transport device, so that efficiency of driving force transmission to the cartridge-spool driving system can be enhanced.

Further, the spool gear 3a is disposed at the perimeter of the spool chamber and is arranged to be relatively large in size. Therefore, the output of the spool gear 3a can be taken out from any direction. In other words, the setting position of the thrust gear 11 is selectable with a wide range of latitude.

Further, in the film transport device according to the first embodiment, the driving action for winding the film is performed by causing the planet gear 8 to mesh with the rewinding gear 13 for power transmission. Therefore, even if the location of the rewinding gear 13 (determined by the location of the thrust gear 11) is relatively far from the second reduction gear 7 (a sun gear for the planet gear 8), the distance can be easily covered by changing the size of the planet gear 8.

The above arrangement of the film transport device according to the first embodiment thus permits the relatively thick clutch gear train (11, 12 and 13), the planet gear train (8 and 9) and the reduction gear train (5, 6 and 7) to be closely arranged above the spool gear 3a. The gears 14, 15 and 16 which follow the clutch gear train (11, 12 and 13) can be arranged in a relatively thin space extending to the fork gear 16. In other words, although the film transport device includes the clutch part 12, it can be arranged without setting any bulky gear part within a thin space available above a cartridge chamber in which the film cartridge 1 is to be placed and also within a thin space available between the cartridge chamber and the spool chamber. Therefore, wider spaces other than these thin spaces can be used for members other than the film transport device. The arrangement described above, therefore, permits effective utilization of spaces within the apparatus using the film transport device.

In addition, since the clutch gear train (11, 12 and 13), the planet gear train (8 and 9) and the reduction gear train (5, 6 and 7) can be closely arranged above the spool gear 3a, they can be formed into one unit. Such a unit can be also used in various kinds of apparatuses.

Further, in the first embodiment, the moving range of the planet gear 8 is limited to two positions, i.e., the position where the planet gear 8 is in mesh with the rewinding gear 13 and the position where the planet gear 8 is away from the rewinding gear 13. Therefore, compared with a case where the planet gear 8 is arranged, for example, to selectively mesh with two gears, the planet gear 8 can be arranged to have a smaller moving range. Hence, the first embodiment permits reduction in size of the film transport device in this respect.

Incidentally, in the first embodiment, the planet gear 8 may be arranged to come to mesh, for example, with the idler gear 15 instead of with the rewinding gear 13 at the time of film rewinding. Such a modification can be made without difficulty as long as the clutch part 12 can be released from the connecting state for film rewinding.

Figure 2:
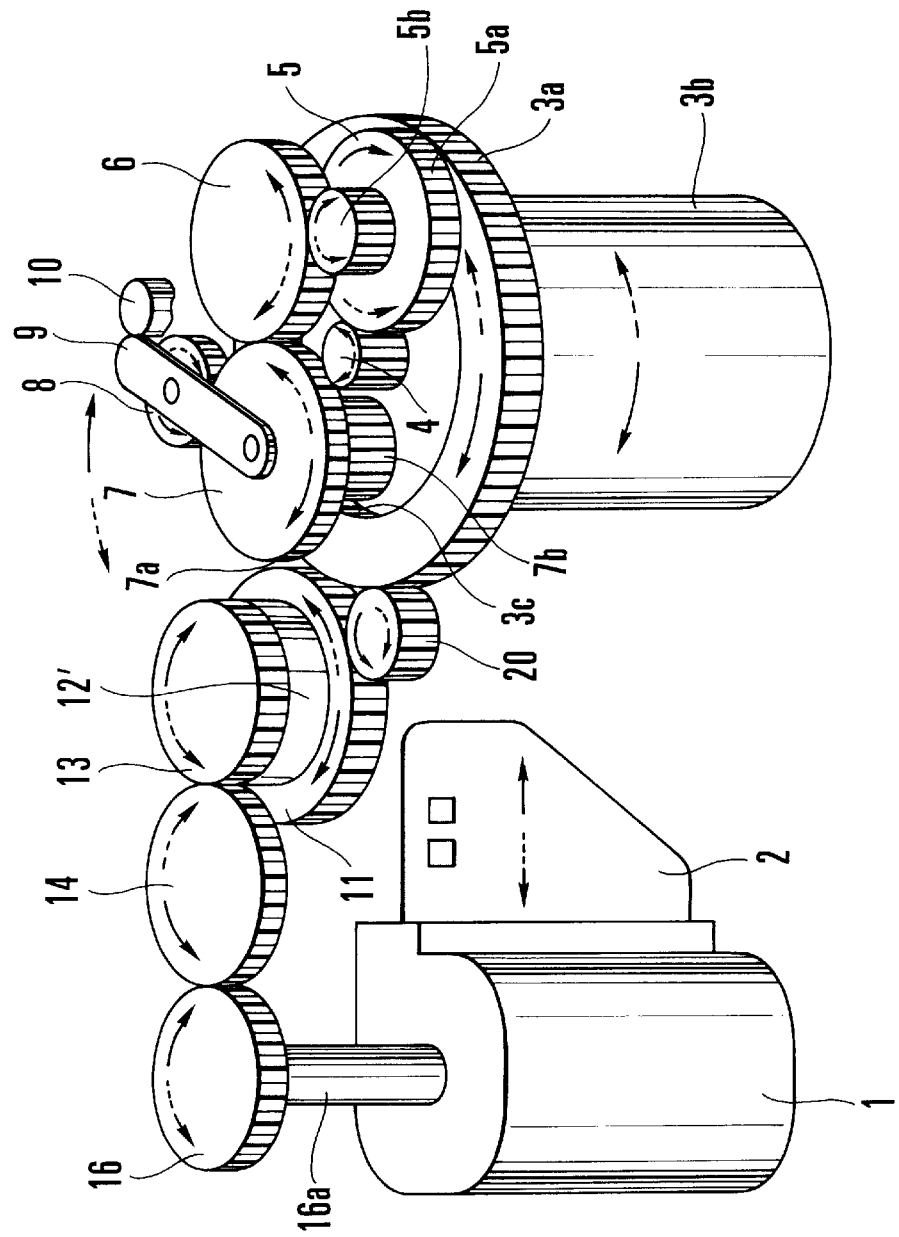
FIG. 2 is a perspective view showing a film transport device according to a second embodiment of the invention.

FIG. 2 shows in a perspective view a film transport device according to a second embodiment of the invention. In FIG. 2, all component elements that are in common with the first embodiment shown in FIG. 1 are indicated by the same reference numerals, and the details of these elements are omitted from the following description. The second embodiment differs from the first embodiment in that the spool gear 3a is provided with an internal gear part 3c, the small gear part 7b of the second reduction gear 7 is in mesh with the internal gear part 3c, and the thrust gear 11 is arranged to engage with the spool gear 3a (external gear part) through an idler gear 20.

In the film transport device according to the second embodiment, too, when the pinion gear 4 is rotated by the motor in the direction of film winding (in the direction of a full-line arrow), the driving force of the motor is transmitted to the spool gear 3a through the reduction gear train (5, 6 and 7) to cause the take-up spool 3 to rotate also in the direction of a full-line arrow. In this case, the internal intermeshing of the small gear part 7b of the second reduction gear 7 with the internal gear part 3c of the spool gear 3a gives a wider meshing range to make the driving action on the spool 3 more stabilized by as much as the increase in the meshing range than a case where the small gear part 7b is externally in mesh with the spool gear 3a as in the case of the first embodiment.

The spool gear 3a transmits the driving force of the motor to the thrust gear 11 through the idler gear 20 to cause the thrust gear 11 to rotate in the direction of a full-line arrow. In this instance, the rotation of the second reduction gear 7 causes the planetary arm 9 to turn in such a direction as to abut on the stopper 10, so that the planet gear 8 is retracted to a position where the planet gear 8 does not mesh with any gear.

Figure 5:
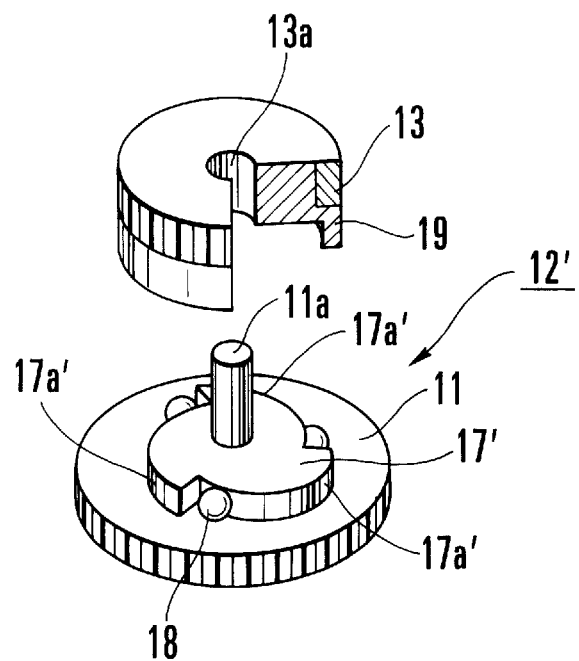
FIG. 5 is an exploded perspective view showing a clutch part used in the film transport device in the second embodiment.

As shown in FIG. 5, a clutch part 12' disposed between the thrust gear 11 and the rewinding gear 13 differs from the clutch part 12 in the first embodiment (see FIG. 4), in the shape of projection parts 17a' of a cam plate 17', i.e., in the biting-in direction of the steel balls 18 into the projection parts 17a' and the clutch tube 19. More specifically, when the thrust gear 11 rotates in the direction of a full-line arrow in FIG. 2 in thrusting out the film from the cartridge, the cam plate 17', which is formed integrally with the thrust gear 11, pushes the steel balls 18 against the inner wall of the clutch tube 19. Therefore, the clutch part 12' comes into a connecting state to cause the rewinding gear 13 to rotate at the same speed as the thrust gear 11. After that, when the film 2 is taken up to be wound on the take-up spool 3 and the rewinding gear 13 comes to rotate in the direction of the full-line arrow at a speed faster than the thrust gear 11, the inner wall of the clutch tube 19 moved the steel balls 18 into the recessed parts formed between the projection parts 17a' of the cam plate 17', so that the clutch part 12' is released from the connecting state. After that, the winding driving of the film 2 is performed solely by means of the take-up spool 3.

On the other hand, when the pinion gear 4 is rotated by the motor in the film rewinding direction, i.e., in the direction of a broken-line arrow, the driving force of the motor is transmitted to the spool gear 3a through the reduction gear train (5, 6 and 7) to cause the take-up spool 3 to rotate also in the direction of a broken-line arrow. Further, the spool gear 3a transmits the driving force of the motor also to the thrust gear 11 through the idler gear 20 to cause the thrust gear 11 to rotate in the direction of a broken-line arrow. In this instance, the rotation of the second reduction gear 7 causes the planetary arm 9 to turn away from the stopper 10. As a result, the planet gear 8 comes to mesh with the rewinding gear 13 to cause the rewinding gear 13 to rotate in the direction of a broken-line arrow.

Both the rewinding gear 13 and the thrust gear 11 thus rotate in the same direction with the clutch part 12' interposed between them. However, the reduction ratio of a part from the motor to the rewinding gear 13 (the reduction ratio of the gears 4, 5, 6, 7a, 8 and 13) is set larger than the reduction ratio of a part from the motor to the thrust gear 11 (the reduction ratio of the gears 4, 5, 6, 7, 3a, 20 and 11). Therefore, in driving for film rewinding, the rewinding gear 13 rotates always slower than the thrust gear 11. Hence, the cam plate 17' then rotates in such a direction as to moved the steel balls 18 into the recessed parts formed between the projection parts 17a', thereby releasing the clutch part 12' from the connecting state at the time of driving for film rewinding. In this instance, therefore, the driving force of the motor is transmitted to the fork gear 16 through the second reduction gear 7, the planet gear 8, the rewinding gear 13 and the idler gear 14.

With the film transport device according to the second embodiment arranged in the above-described manner, the same advantageous effect as that of the first embodiment can be attained.

FIG. 3 shows in a perspective view a film transport device according to a third embodiment of the invention. All the component elements of the third embodiment that are in common with those of the second embodiment are indicated by the same reference numerals, and the details of them are omitted from the following description. The third embodiment differs from the second embodiment in that the spool gear 3a and the thrust gear 11 are arranged to intermesh directly with each other, and an idler gear 21 is interposed in between the planet gear 8 and the rewinding gear 13 which are arranged to engage with each other in driving for film rewinding.

In the film transport device according to the third embodiment, too, when the pinion gear 4 is rotated by the motor in the direction of film winding, i.e., in the direction of a full-line arrow as shown in FIG. 3, the driving force of the motor is transmitted to the spool gear 3a through the reduction gear train (5, 6 and 7). The take-up spool 3 then also rotates in the direction of a full-line arrow.

Further, the spool gear 3a transmits the driving force of the motor also to the thrust gear 11 to cause the thrust gear 11 to rotate in the direction of a full-line arrow. In this instance, the rotation of the second reduction gear 7 causes the planetary arm 9 to turn in such a direction as to abut on the stopper 10. As a result, the planet gear 8 is retracted to a position where the planet gear 8 does not mesh with any gear.

The clutch part 12 disposed between the thrust gear 11 and the rewinding gear 13 is the same as the clutch part in the first embodiment (see FIG. 4). When the thrust gear 11 rotates in the direction of a full-line arrow in FIG. 3 in thrusting out the film from the cartridge, the cam plate 17, which is formed integrally with the thrust gear 11, pushes the steel balls against the inner wall of the clutch tube 19, so that the clutch part 12 is brought into a connecting state. The rewinding gear 13 thus rotates at the same speed as the thrust gear 11. After that, when the film 2 is taken up to be wound on the take-up spool 3 and the rewinding gear 13 comes to rotate in the direction of the full-line arrow at a speed faster than the thrust gear 11, the inner wall of the clutch tube 19 moved the steel balls 18 into the recessed parts formed between the projection parts 17a of the cam plate 17, so that the clutch part 12 is released from the connecting state. After that, the winding driving of the film 2 is performed solely by means of the take-up spool 3.

On the other hand, when the pinion gear 4 is rotated by the motor in the film rewinding direction, i.e., in the direction of a broken-line arrow, the driving force of the motor is transmitted to the spool gear 3a through the reduction gear train (5, 6 and 7) to cause the take-up spool 3 to rotate also in the direction of a broken-line arrow. Further, the spool gear 3a transmits the driving force of the motor also to the thrust gear 11 to cause the thrust gear 11 to rotate in the direction of a broken-line arrow. In this instance, the rotation of the second reduction gear 7 causes the planetary arm 9 to turn away from the stopper 10. As a result, the planet gear 8 comes to engage with the rewinding gear 13 through the idler gear 21 to cause the rewinding gear 13 to rotate in the direction of a broken-line arrow.

Both the rewinding gear 13 and the thrust gear 11 thus rotate in the same direction with the clutch part 12 interposed between them. However, the reduction ratio of a part from the motor to the rewinding gear 13 (the reduction ratio of the gears 4, 5, 6, 7a, 8, 21 and 13) is set larger than the reduction ratio of a part from the motor to the thrust gear 11 (the reduction ratio of the gears 4, 5, 6, 7, 3a and 11). Therefore, in driving for film rewinding, the rewinding gear 13 rotates always slower than the thrust gear 11. Hence, the cam plate 17 then rotates in such a direction as to moved the steel balls 18 into the recessed parts formed between the projection parts 17a, thereby releasing the clutch part 12 from the connecting state at the time of driving for film rewinding. In this instance, therefore, the driving force of the motor is transmitted to the fork gear 16 through the second reduction gear 7, the planet gear 8, the rewinding gear 13 and the idler gears 14 and 15.

With the film transport device according to the third embodiment arranged in the above-described manner, the same advantageous effect can be attained as in the cases of the first and second embodiments.

Figure 6:
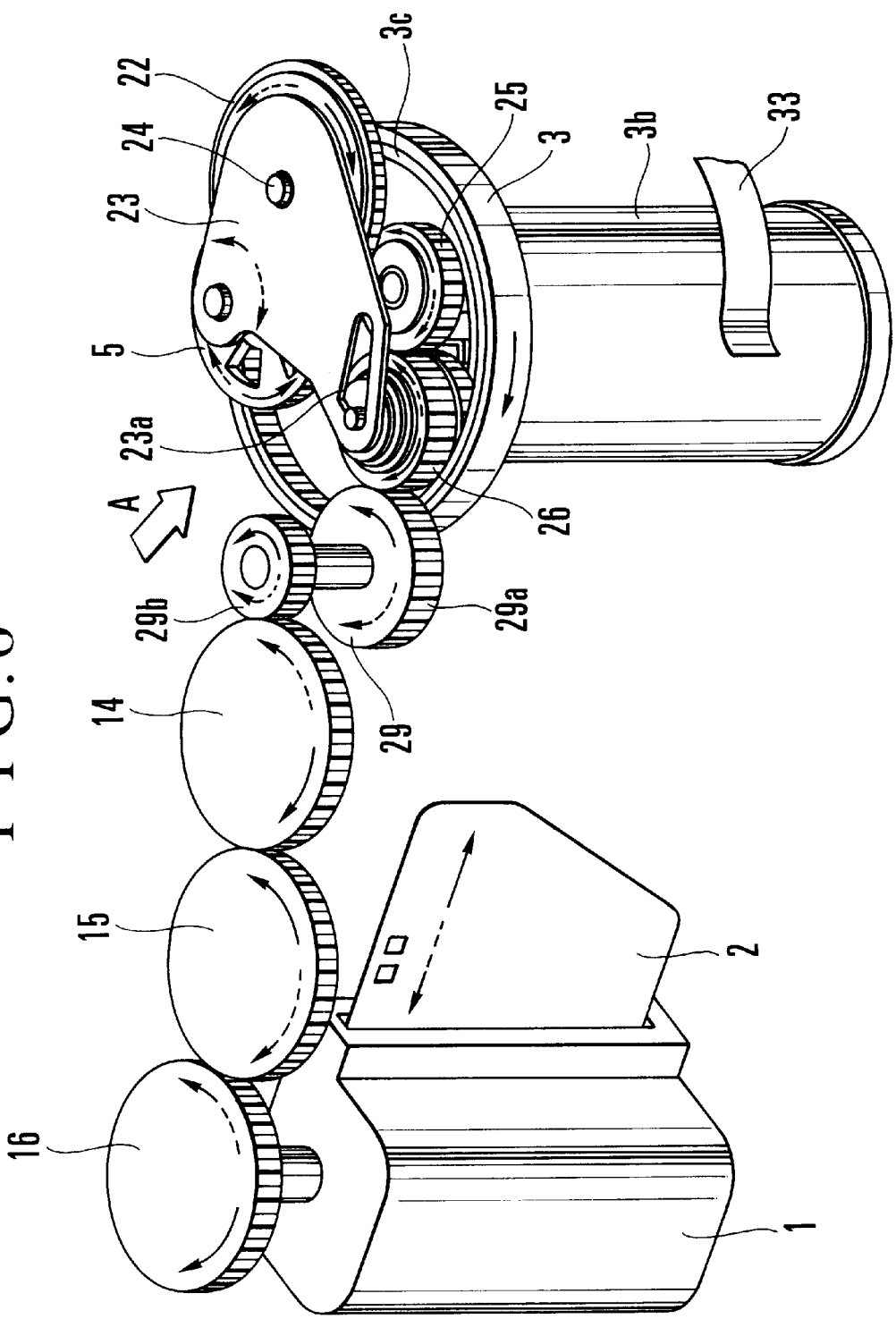
FIG. 6 is a perspective view showing a film transport device according to a fourth embodiment of the invention.

FIG. 6 shows in a perspective view a film transport device according to a fourth embodiment of the invention. FIG. 7 is an exploded perspective view showing a gear head part of the film transport device as viewed from the direction of an arrow A in FIG. 6. In FIGS. 6 and 7, all component elements that are in common with the above-described embodiments are indicated by the same reference numerals, and the details of them are omitted from the following description.

Referring to FIGS. 6 and 7, a pinion gear 4 is connected directly to a film transport motor (not shown). A reduction gear 5 has a large gear part 5a which is in mesh with the pinion gear 4. A planet gear 22 is arranged to have the reduction gear 5 as a sun gear and to revolve around the reduction gear 5. A large gear part 22a of the planet gear 22 is in mesh with a small gear part 5b of the reduction gear 5. A planetary plate 23 is arranged to cause a small gear part 22b of the planet gear 22 to be selectively come to mesh with the internal gear part 3c of the take-up spool 3 or with a sun gear 25. A planet shaft 24 is arranged to rotatably carry the planet gear 22 through a spring (not shown). The sun gear 25 is arranged to rotate in a fixed position where the sun gear 25 never meshes with the internal gear part 3c of the take-up spool 3. A planetary clutch gear 26 is arranged to be always in mesh with the sun gear 25 and a large gear part 29a of a transmission gear 29 and to turn around the sun gear 25. A planetary thrust gear 27 is arranged to turn around the sun gear 25 between a position where the planetary thrust gear 27 meshes with the internal gear part 3c of the take-up spool 3 and another position where the planetary thrust gear 27 does not mesh with the internal gear part 3c, while carrying out a clutching function between the planetary thrust gear 27 and the planetary clutch gear 26. A clutch shaft 28 acts as a rotating shaft for the planetary clutch gear 26 and the planetary thrust gear 27. The clutch shaft 28 has an end projection 28a which engages a cam part 23a of the planetary plate 23, so that the position of the clutch shaft 28, i.e., the revolving position of the planetary thrust gear 27, is controlled by the planetary plate 23.

Figure 8:
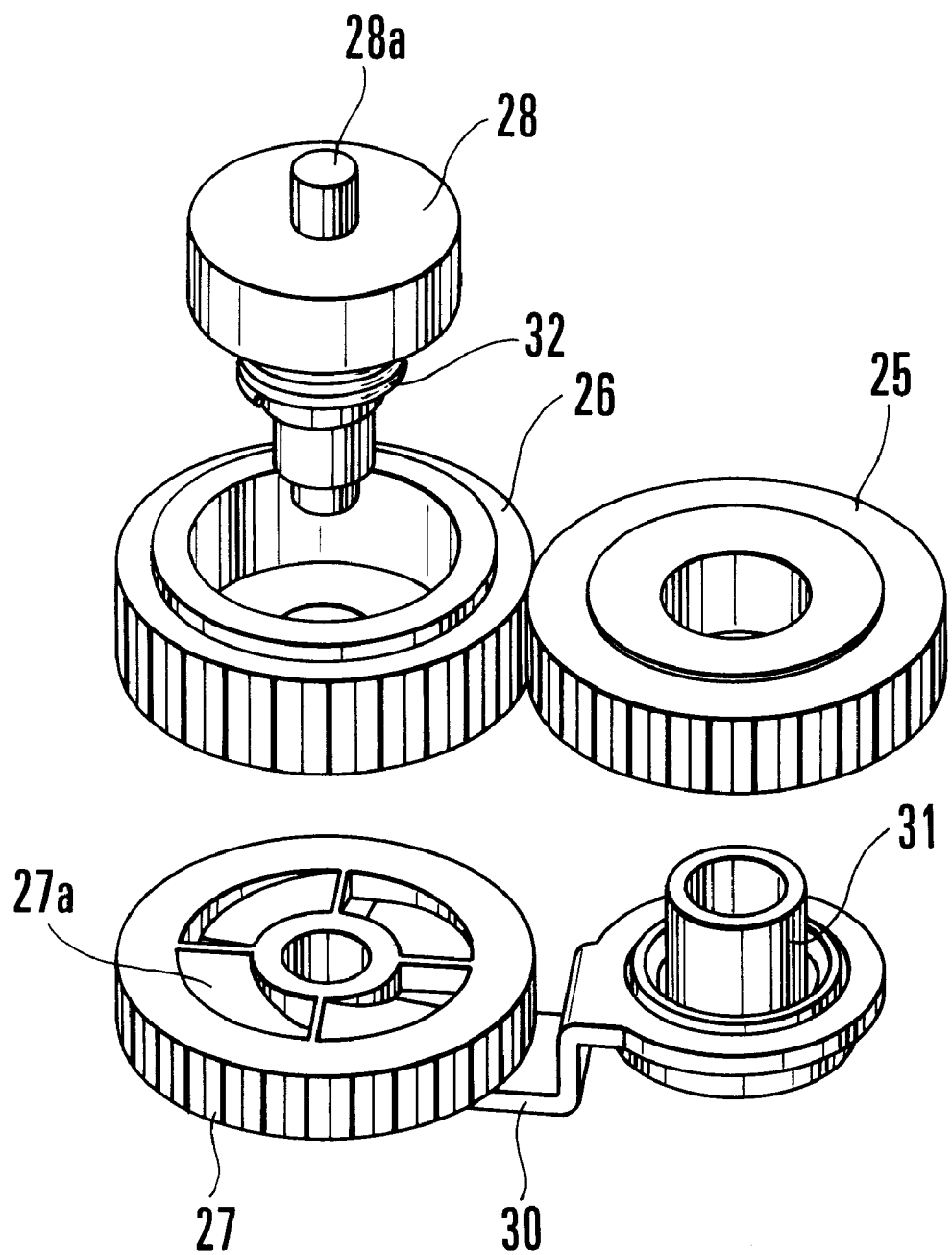
FIG. 8 is an exploded perspective view showing a clutch part in the film transport device shown in FIG. 6.
Figure 9:
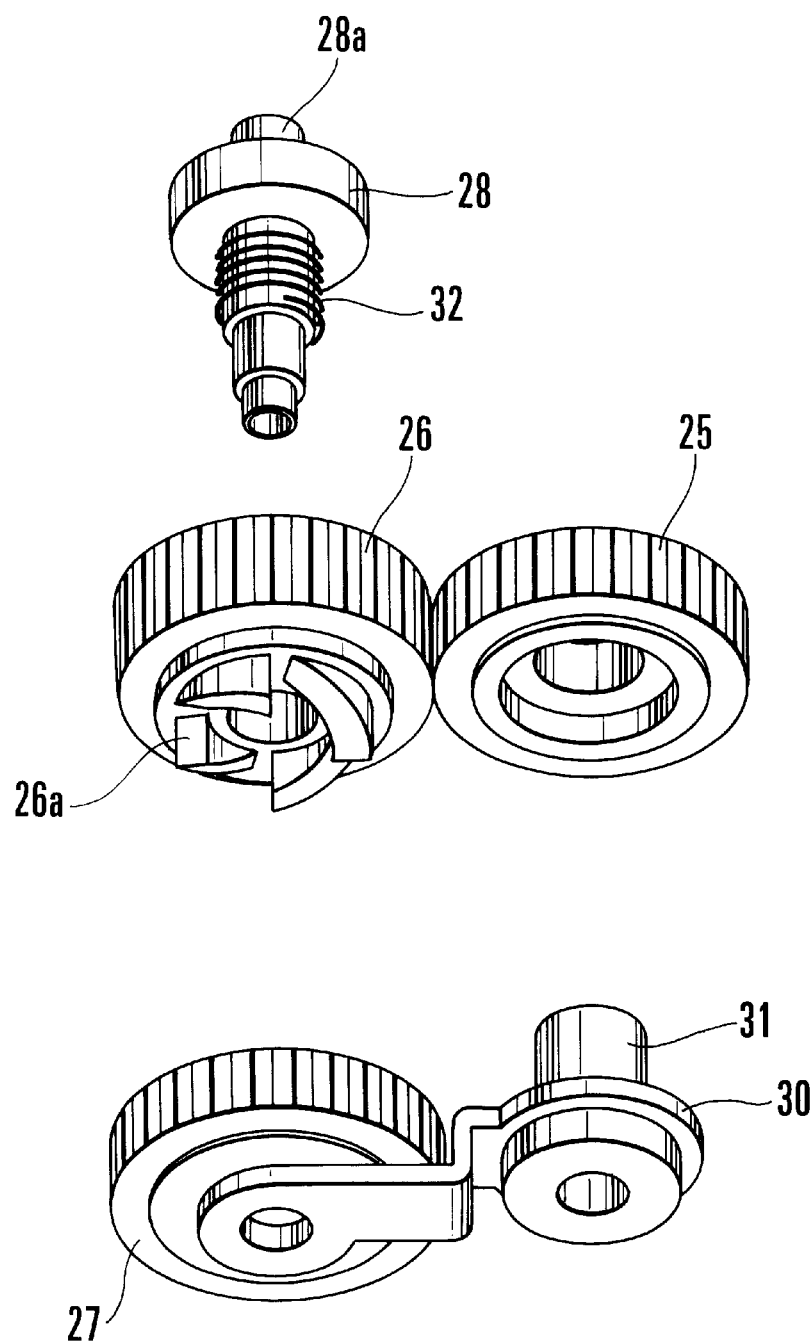
FIG. 9 is an exploded perspective view showing also the clutch part in the film transport device shown in FIG. 6.

FIGS. 8 and 9 are exploded perspective views showing a clutch part composed of the planetary clutch gear 26 and the planetary thrust gear 27 shown in FIG. 6. Referring to FIGS. 8 and 9, a sun-gear rotation sleeve 31 is caulked integrally with the planetary plate 30 and is fitted in the sun gear 25. The planetary clutch gear 26 is provided with slanting claw faces 26a on its lower side as shown in FIG. 9. The planetary thrust gear 27 is also provided with slanting claw faces 27a as shown in FIG. 8. The clutch shaft 28 is carried by the planetary plate 30 while compressing a coil spring 32 to push the planetary clutch gear 26 against the planetary thrust gear 27.

Figure 10:
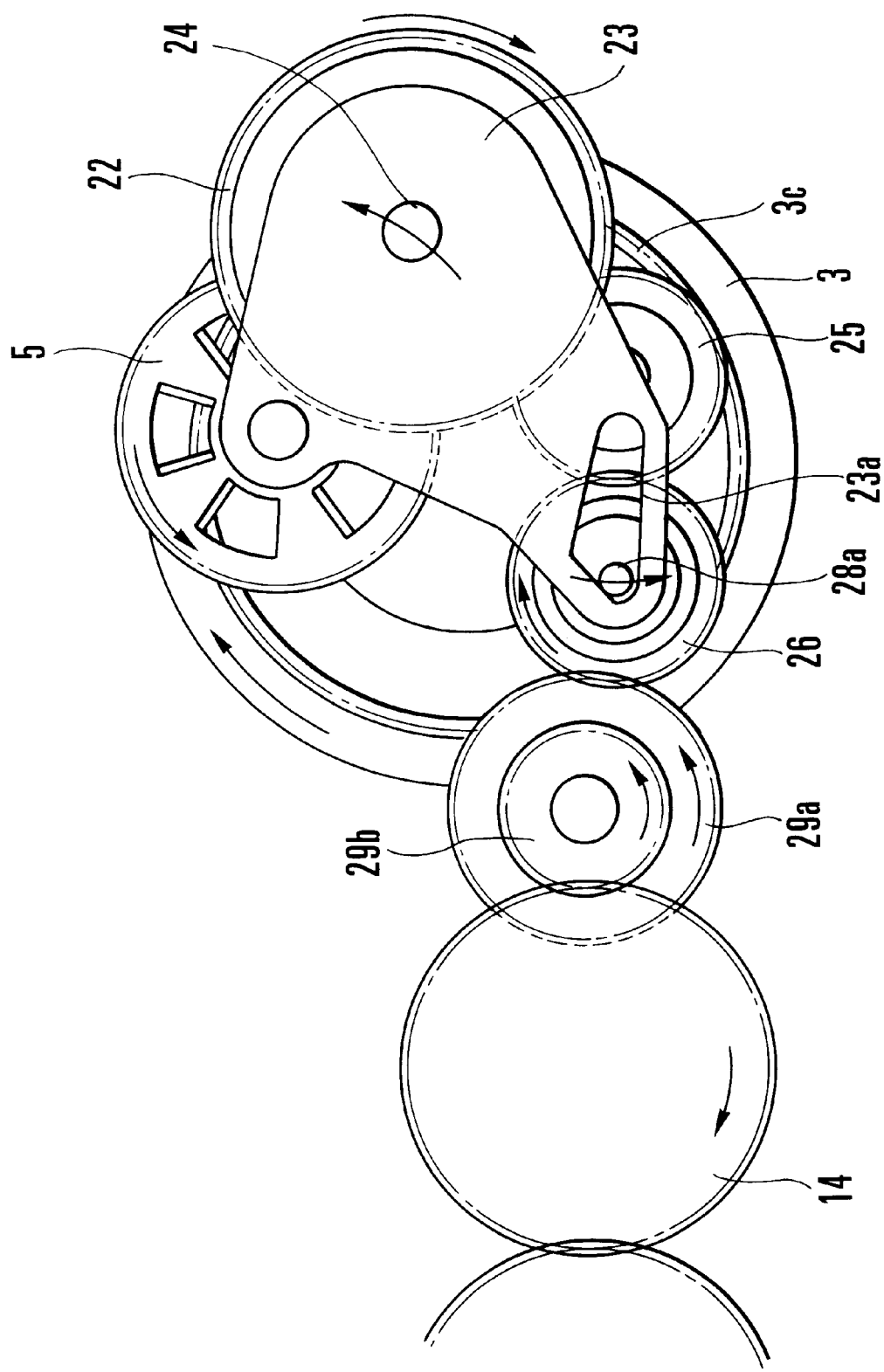
FIG. 10 is a plan view showing the film transport device in FIG. 6 in the state where a film thrusting-out operation is started.

Next, operation of the film transport device arranged as described above according to the fourth embodiment will be described. FIG. 10 is a plan view showing the state of the film transport device at the time when the operation of thrusting out the film from the cartridge is started. Referring to FIG. 10, the reduction gear 5 which is driven by the pinion gear 4 (not shown in FIG. 10) rotates in the direction of an arrow. The planet gear 22, which is in mesh with the reduction gear 5, receives a revolving force which is exerted on the planet shaft 24 in the direction of an arrow. The planet gear 22 is thus brought into a position where the planet gear 22 is held in a state of meshing with the internal gear part 3c of the take-up spool 3. In this position, the planet gear 22 is out of mesh with the sun gear 25. Then, the take-up spool 3 is caused by the planet gear 22 to rotate in the direction of an arrow, i.e., in the film winding direction. In this instance, since the internal gear part 3c of the take-up spool 3 has a large diameter, a sufficient amount of speed reduction is possible, despite the fact that there are only a few number of gear stages between the pinion gear 4 and the internal gear part 3c of the take-up spool 3.

Further, the end projection 28a of the clutch shaft 28 is restricted to be on the side of the internal gear part 3c of the take-up spool 3 by the action of the cam part 23a of the planetary plate 23. By virtue of this action, the planetary thrust gear 27 is kept in a state of meshing with the internal gear part 3c of the take-up spool 3. Since the planetary thrust gear 27 is rotated in such a direction that the slanting claw faces 27a of the planetary thrust gear 27 shown in FIG. 8 mesh with the slanting claw faces 26a of the planetary clutch gear 26, the planetary clutch gear 26 rotates integrally with the planetary thrust gear 27. The power of the planetary clutch gear 26 is thus transmitted to the large gear part 29a of the transmission gear 29. In other words, the planetary thrust gear 27 is arranged such that the power of the internal gear part 3c of the take-up spool 3 which is driven by the rotating force of the planet gear 22 is extracted from a different part of the internal gear part 3a and transmitted to the fork gear 16 by the planetary thrust gear 27.

In the state shown in FIG. 10, the individual gears rotate in the direction of full-line arrows, and the film 2 is driven by the fork gear 16 to be thrust out from the cartridge 1. The film 2 which is thrust out is taken up to be wound on the take-up spool in a state of being pushed by an elastic member 33 against the take-up spool 3. Then, since the film winding speed of the take-up spool 3 is set faster than the film thrusting-out speed of the fork gear 16, the film 2 is pulled out from the cartridge 1 at a speed faster than the film thrusting-out speed of the fork gear 16. Therefore, a tensile force of the tape 2 caused by the rotation of the take-up spool 3 is transmitted to the fork gear 16. Then, since the planetary clutch gear 26 is caused to rotate in the direction of a full-line arrow at a speed faster than the planetary thrust gear 27, the engaging connection between the planetary clutch gear 26 and the planetary thrust gear 27 is canceled, so that the film 2 is wound up solely by the rotation of the take-up spool 3. Incidentally, in this instance, since the sun gear 25 is always in mesh with the planetary clutch gear 26, the sun gear 25 is driven to rotate by the planetary clutch gear 26. However, the rotation of the sun gear 25 is nothing but an idle rotation. Therefore, the film 2 can be thrust out and wound up without hindrance.

Figure 11:
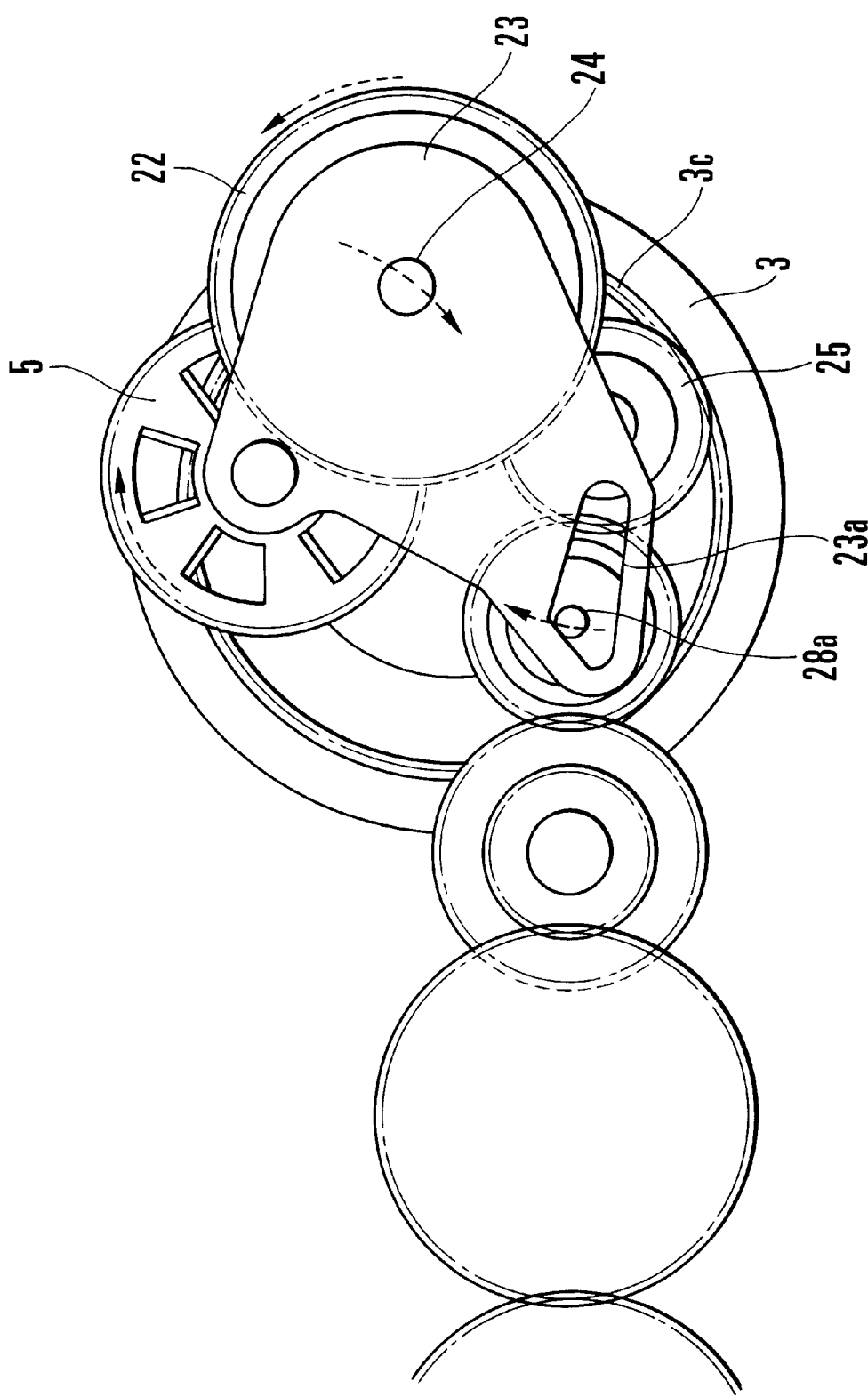
FIG. 11 is a plan view showing the film transport device in FIG. 6 in the state where the change-over to a film rewinding operation is performed.

FIG. 11 shows in a plan view the state of the film transport device obtained immediately after the change-over from the film thrusting-out and winding-up operation to a film rewinding operation. Referring to FIG. 11, the reduction gear 5, which receives power from the pinion gear 4 (not shown in FIG. 11), is driven in the direction of an arrow indicated by a broken line. The small gear part 22b of the planet gear 22 is then released from its state of meshing with the internal gear part 3c of the take-up spool 3 by the turning of the planetary plate 23 in the direction of an arrow indicated by a broken line, so that the planet gear 22 moves in such a direction as to mesh with the sun gear 25. At the same time, the end projection 28a of the clutch shaft 28 is caused by the motion of the cam part 23a of the planetary plate 23 to move in the direction of a broken-line arrow to a position where the planetary thrust gear 27 never meshes with the internal gear part 3c of the take-up spool 3.

Figure 12:
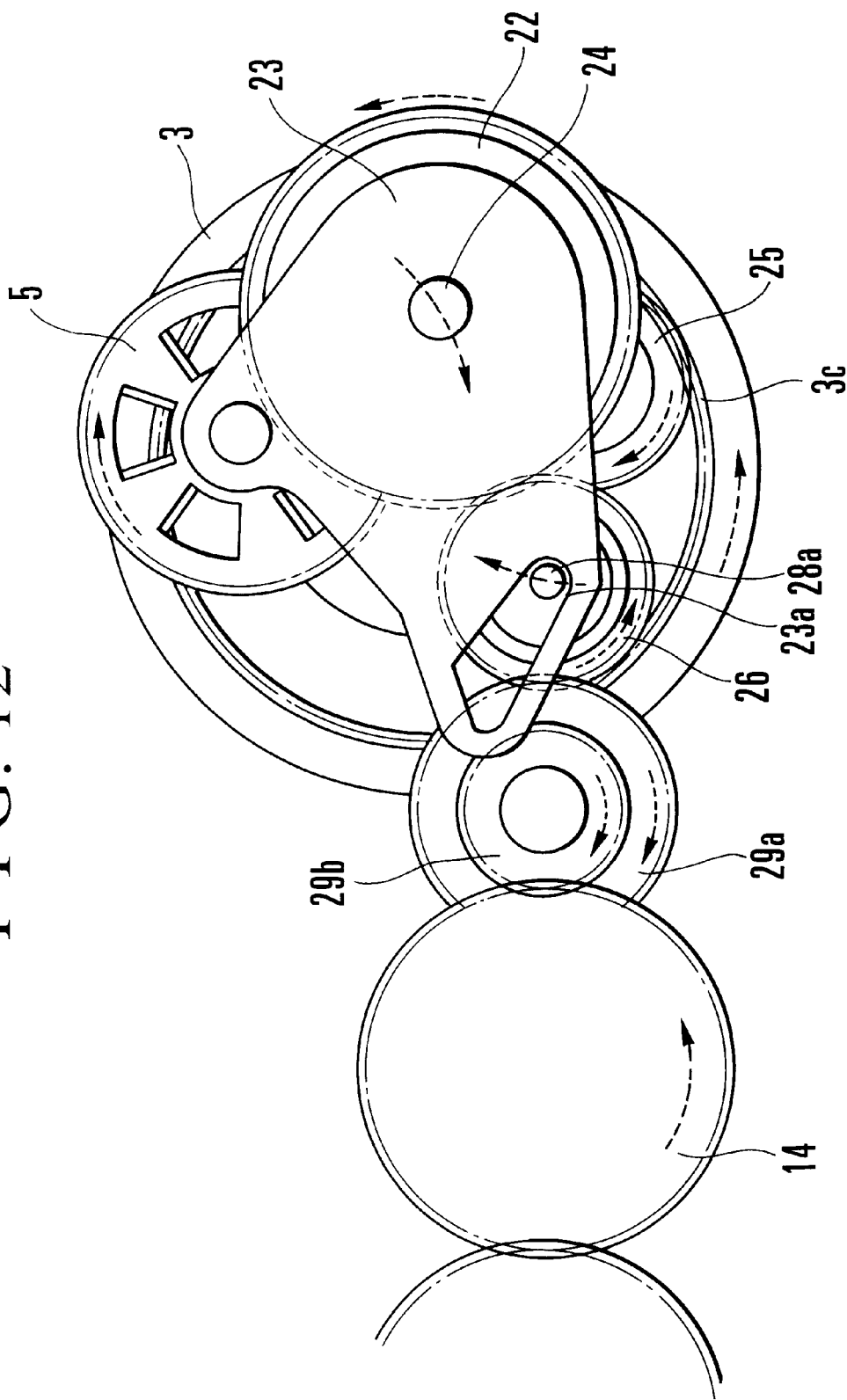
FIG. 12 is a plan view showing the film transport device in FIG. 6 in the state where the film rewinding operation is in process.

FIG. 12 shows in a plan view the state of the film transport device where the film rewinding operation is in process. In this state, the small gear part 22b of the planet gear 22 is in mesh with the sun gear 25 to impart a turning force in the direction of a broken-line arrow. The planetary clutch gear 26, while receiving a force of revolving around the sun gear 25, is kept by the position restricting action of the cam part 23a of the planetary plate 23 in a position where the planetary thrust gear 27 never meshes with the internal gear part 3c of the take-up spool 3. A film rewinding driving force in the direction of a broken-line arrow is thus transmitted to the fork gear 16 through the sun gear 25, the planetary clutch gear 26, the transmission gear 29 and the idler gears 14 and 15. Therefore, the take-up spool 3 is allowed to rotate, free from the driving force of the motor, following a force of rewinding the film wound on the film winding part 3b. Then, the presence of the elastic member 33 (a leaf spring or the like) shown in FIG. 6 ensures that the film 2 can be transported without slackening its coiled state on the film winding part 3b of the take-up spool 3, even if the film winding operation and the film rewinding operation are repeatedly performed.

With the film transport device according to the fourth embodiment arranged as described above, the same advantageous effect can be attained as in the cases of the above-described embodiments.

The individual components shown in schematic or block form in the drawings are all well-known in the camera arts and their specific construction and operation are not critical to the operation or best mode for carrying out the invention.

While the invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the spool gear disposed at the film take-up spool is used as an intermediate gear for transmission of a film transport driving force in each of the embodiments disclosed, the invention is not limited to the arrangement disclosed. The spool gear may be used as an intermediate gear for transmission of a driving force other than the film transport driving force, such as an optical system driving force.

The invention may be carried out by combining as necessary the embodiments or their technological elements described in the foregoing.

The invention applies to cases where either the whole or a part of claims or the arrangement of each embodiment described forms an apparatus or is used in combination with some other apparatus or as a component element of an apparatus.

Further, the invention is applicable to cameras of various kinds, such as a single-lens reflex camera and a lens-shutter type camera, and apparatuses other than cameras, such as a film viewing apparatus, a film using apparatus, a power transmission apparatus, etc.

What is claimed is:

1. A film transport apparatus, comprising:
   (a) a spool which winds thereon a film taken out from a film cartridge;
   (b) a motor located in said spool;
   (c) a spool gear to which an output of said motor is transmitted to drive said spool; and
   (d) a film cartridge driving mechanism which transmits the output of said motor to said film cartridge,
      wherein said film cartridge driving mechanism transmits the output of said motor to said film cartridge through said spool gear when the film is wound, while when the film is rewound transmits the output of said motor to said film cartridge without passing through said spool gear.

2. An apparatus according to claim 1, wherein said spool gear is formed on an outer periphery of said spool.

3. An apparatus according to claim 1, wherein said spool gear is formed on an inner periphery of said spool.

4. An apparatus according to claim 1, wherein said film cartridge driving mechanism has a planet clutch mechanism whose sun gear meshes with said spool gear.

5. An apparatus according to claim 1, wherein said film cartridge driving mechanism has a clutch which disconnects two gears from each other if the gears have a different speed.

6. An apparatus according to claim 1, wherein said film cartridge driving mechanism switches a transmission route of the output of the motor so as to prevent the transmission of the output to said spool gear when the film is rewound.

7. A film transport apparatus, comprising:
   (a) a spool which wound thereon a film taken out from a film cartridge;
   (b) a motor located in said spool;
   (c) a spool gear to which an output of said motor is transmitted to drive said spool;
   (d) a first film cartridge driving mechanism which transmits the output of said motor to said film cartridge through said spool gear when the film is wound; and
   (e) a second film cartridge driving mechanism which transmits the output of said motor to said film cartridge without passing through said spool gear when the film is rewound.

8. An apparatus according to claim 7, wherein said spool gear is formed on an outer periphery of said spool.

9. An apparatus according to claim 7, wherein said spool gear is formed on an inner periphery of said spool.

10. An apparatus according to claim 7, wherein said second film cartridge driving mechanism cuts off the transmission of the output of said motor by said first film cartridge driving mechanism when the film is rewound.

11. An apparatus according to claim 7, wherein said second film cartridge driving mechanism cuts off the connection between said motor and said spool gear when the film is rewound.

12. A film transport apparatus, comprising:
   (a) a spool which winds thereon a film taken out from a film cartridge;
   (b) a motor located in said spool;
   (c) a spool gear to which an output of said motor is transmitted to drive said spool;
   (d) a film cartridge driving mechanism which transmits the output of said motor to said film cartridge,
      wherein said film cartridge driving mechanism transmits the output of said motor to said film cartridge through said spool gear when said motor rotates in a first direction, and transmits the output of said motor to said film cartridge without passing through said spool gear when said motor rotates in a second direction.

13. A film transport apparatus, comprising:
(a) a spool which winds thereon a film taken out from a film cartridge;
(b) a motor located in said spool;
(c) a spool gear to which an output of said motor is transmitted to drive said spool;
(d) a first film cartridge driving mechanism which transmits the output of said motor to said film cartridge through said spool gear when said motor rotates in a first direction; and
(e) a second film cartridge driving mechanism which transmits the output of said motor to said film cartridge without passing through said spool gear when said motor rotates in a second direction.

* * * * *